United States Patent [19]

Grindahl

[11] Patent Number: 4,876,700
[45] Date of Patent: Oct. 24, 1989

[54] DATA DEMODULATOR

[75] Inventor: Mervin L. Grindahl, Waseca, Minn.

[73] Assignee: E. F. Johnson Company, Waseca, Minn.

[21] Appl. No.: 852,539

[22] Filed: Apr. 16, 1986

[51] Int. Cl.$^4$ ............................................. H04L 27/06
[52] U.S. Cl. ...................................... 375/87; 375/120
[58] Field of Search .................... 375/55, 84, 87, 95, 375/110, 13, 81, 82, 94, 120; 360/40, 43, 44, 51; 455/608; 329/50, 104

[56] References Cited

U.S. PATENT DOCUMENTS

| | | | |
|---|---|---|---|
| 3,742,353 | 6/1973 | Parisi | 324/75 |
| 3,815,029 | 6/1974 | Wilson | 375/119 |
| 3,825,844 | 7/1974 | Peterman et al. | 375/95 |
| 4,088,832 | 5/1978 | Eastmond | 375/87 |
| 4,185,273 | 1/1980 | Gowan | 360/51 |
| 4,317,211 | 2/1982 | Quesnell Jr. | 360/44 |
| 4,355,423 | 10/1982 | Theall | 455/608 |
| 4,433,425 | 2/1984 | DeJaeger | 375/13 |
| 4,435,825 | 3/1984 | Tomooka | 375/113 |
| 4,451,917 | 5/1984 | DeCoursey | 370/108 |
| 4,485,470 | 11/1984 | Reali | 370/100 |
| 4,513,427 | 4/1985 | Borriello et al. | 375/87 |
| 4,539,524 | 9/1985 | Goode | 375/81 |
| 4,542,420 | 9/1985 | Kozlik et al. | 375/87 |
| 4,603,322 | 7/1986 | Blair | 375/87 |
| 4,635,280 | 1/1987 | Smith et al. | 375/120 |

Primary Examiner—Benedict V. Safourek
Assistant Examiner—Stephen Chin
Attorney, Agent, or Firm—Dorsey & Whitney

[57] ABSTRACT

A unique data recovery circuit which is able to recover transmitted digital data with a data clock embedded therein. No initial timing signals are required for operation of the data recovery circuit. Instead the data clock is recovered from the received data and used to synchronize the flow of data through the circuit. Noise pulses and other anomalous transients are rejected by the circuit so that the data output accurately corresponds to the data transmitted. Operation of the invention is achieved through a number of expedients which include a random access memory delay line which delays interpretation of the data until the data clock has been recovered. A uniquely integrated delay switching network is utilized to switch recovery of the clock from the received data to the delayed data. A phase locked loop and an integrate, sample and dump circuit are also employed, both of which use asynchronous ripple counters to achieve the primary objective of the invention which is to recover the data transmitted.

20 Claims, 5 Drawing Sheets

DATA DEMODULATOR

RELATED APPLICATIONS

This application is related to co-pending application entitled AUTOMATIC/REMOTE RF INSTRUMENT READING METHOD AND APPARATUS, filed in the U.S. patent and trademark office on Feb. 20, 1985 and identified by Ser. No. 703,621 and to co-pending application entitled IMPROVED AUTOMATIC/REMOTE RF INSTRUMENT MONITORING SYSTEM, filed Mar. 14, 1986 and identified by Ser. No. 839,889.

This application is also related to my copending application entitled Digital Frequency Detector filed in the U.S. patent and trademark office on Apr. 15, 1986 and identified by Ser. No. 852,155 and the application entitled Remotely Interrogated Transponder filed in the U.S. patent and trademark office on June 1, 1987 and identified by Ser. No. 852,154.

BACKGROUND OF THE INVENTION

The present invention relates to data recovery circuits which recover both the data transmitted and an embedded data clock. More particularly, the present invention can be used to decode received radio frequency (RF) transmissions of the type disclosed and discussed in the two above mentioned patent applications.

Although the present invention has many other applications, the invention was designed to be compatible with and receive data transmissions of the type described in the two above identified patent applications, the disclosures of which are incorporated herein by reference.

Those two applications describe a mobile data acquisition system (MDAS) which can be operated from a vehicle driving on city streets. The MDAS is designed to receive data transmissions from a plurality of encoder/receiver/transmitters (ERT's) which are located on utility meters such as gas meters, water meters and electricity meters, and which transmit data from the meters including the meter reading. As will be understood a large number of data transmissions may take place simultaneously, as many as three or more from each residence the vehicle passes, and since the MDAS must cause the ERT's to transmit, a tone signal will alert a large number of ERT's, not only those ERT's which are immediately adjacent the vehicle.

The system described in the foregoing applications, and particularly the last filed application, provides for each ERT to retransmit its data transmission of ninety-six bits, eight times at pseudo-random frequencies. As disclosed in the prior applications this assures that at least one of the data transmissions from each ERT will be monitored, received, decoded and stored by the MDAS.

It will also be obvious, however, that the bit overhead required to make the transmission of data and to receive the data transmitted is of critical importance to the suitability and acceptability of the system. It is therefore extremely important that the data recovery circuit or data demodulator used in such a system is one that can synchronize and recover the data based on a minimum number of transmitted bits.

As a practical matter it is also important in such a system that a minimum number of components be utilized in the data recovery circuit. It will be understood that a number of these data demodulator circuits must be employed to recover the large number of data transmissions which are occurring. Consequently, each additional component used in such a circuit substantially increases the cost of the MDAS.

Accordingly, it is extremely advantageous to minimize both the bit count required to recover the data as well as the component count used in the data recovery circuit.

SUMMARY OF THE INVENTION

The improved transmitters (ERT's) described in co-pending patent application Ser. No. 839,889, filed Mar. 14, 1986, transmit eight data bursts, each data burst being transmitted at a different pseudo-random frequency and each data burst containing ninety-six bits of data. The data clock and the data are modulo-one (Manchester or split phase) encoded for transmission. Preceding informational data from any particular ERT is a twenty-one bit preamble code which, when recognized by the MDAS microprocessor, constitutes word sync and causes the data to be decoded. In one embodiment of the prior described invention, the data is transmitted from the transmitters (ERT's) at a data rate of 16.384 kilobits per second into which is encoded the data clock frequency of 16.384 kilohertz resulting in a Manchester or split phase encoded data stream at 32.768 kilobits per second. The data is transmitted using on-off keying of carrier frequencies in the range of 910 to 920 megahertz.

The raw data is returned to intermediate frequencies by the MDAS and recovered with an envelope detector, threshold and zero crossing detectors. Initially the raw data is edge synchronized with a master clock in the data recovery circuit, operating at 2.065 megahertz. The raw data then follows two distinct and unique paths. Data received is stored, in 65 bit sequences, in a random access memory which constitutes a delay line to recover the actual data transmitted. The raw data is also passed through a raw clock generator which is connected to a phase locked loop in order to recover the data clock from the raw data. After the data clock has been recovered and synchronized with the master clock, the delayed raw data can be decoded and passed through an integrate, sample and dump circuit to obtain the data output. Since the received data will end before the delayed data is completely decoded, a microprocessor activates a delay switching circuit which switches the clock recovery circuit to recover the clock from the delayed data.

The resulting output is the data generated by the particular ERT whose data is being recovered as well as the data clock which generated the data transmission, which is synchronized with the recovered data.

It is an objective of the invention to recover data which has been transmitted at radio frequencies from a remote location.

It is an objective of the invention to recover transmitted data with a minimum number of electronic components.

It is an objective of the invention to recover transmitted data utilizing as few overhead bits as possible to achieve synchronization.

It is an objective of the invention to delay the decoding of data until after a data clock which created the data has been recovered and synchronized with the data stream.

It is an objective of the invention to use asynchronous counting means for timing purpose to minimize the number of components required for a data recovery circuit.

It is an objective of the invention to achieve phase synchronization with asynchronous timing means.

It is an objective of the invention to eliminate transients and other anomalous discontinuities caused by radio transmission and to recover digital data transmitted at pseudo-random radio frequencies.

These and other objectives and advantages of the invention will become obvious to those skilled in the art from a review of the accompanying description of the preferred embodiment, the drawings and the claims appended hereto.

DESCRIPTION OF THE PREFERRED EMBODIMENT

The data demodulator or data recovery circuit 12 is designed to be compatible with and operative in a system such as that described in U.S. patent application No. 703,621, filed Feb. 20, 1985 entitled "Automatic/Remote RF Instrument Reading Method and Apparatus", and more specifically to receive signals generated by the system described in U.S. patent application No. 839,889, filed Mar. 14, 1986 entitled "Improved Automatic/Remote RF Instrument Monitoring System" and transmitted by the system described in U.S. patent application Ser. No. 852,154 entitled "Remotely Interrogated Transponder" filed Apr. 15, 1986. The disclosure of those applications are hereby incorporated herein by reference and those skilled in the art are referred to those applications to obtain a detailed description of the operation of the encoder/receiver transmitters (ERT's) 14 which transmit signals to the data demodulator 12 of the instant invention and for further details relating to the receipt of the signals from the ERT's and processing of the signals for use by utility companies who put into practice the data recovery circuit 12 of the instant invention.

Figure 2:
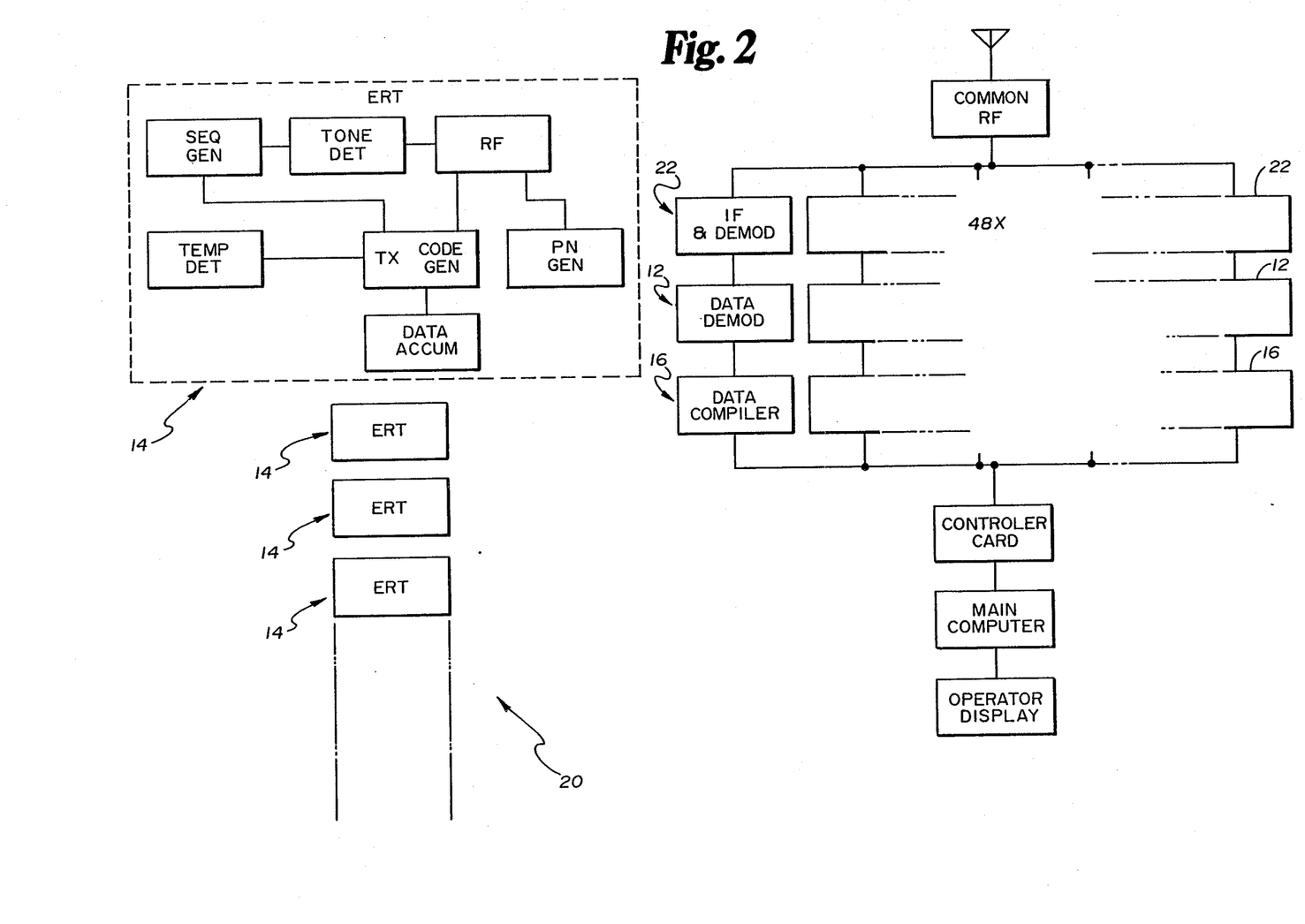
FIG. 2 is a basic block diagram of the system in which the invention is to be used.

The essential features of the foregoing applications describe a remote meter reading (RMR) system 20, the basic elements of which are shown in block diagram form in FIG. 2, which can be advantageously used by utility companies such as gas, water and electric companies and any other periodically metered service organization. Each meter uses an ERT of the type diagramed in FIG. 2. Each of the ERT's 14 transmit data to the mobile data acquisition system (MDAS) 16 which can advantageously be employed in a van which travels along residential and business streets in a predetermined pattern.

The basic sequence of operation includes a tone emitted by the MDAS 16 which "wakes up" each ERT 14 which is within range of the transmitted tone signal. Thereafter, each ERT 14 transmits at sequenced and predetermined times, eight bursts of data, each data transmission being identical in content and each data burst being transmitted on a different pseudo-randomly selected carrier frequency in the range of 910 to 920 megahertz.

Upon receipt of the signals from the ERT's 14 the MDAS 16, with a plurality of intermediate frequency mixing stages 22, reduces the transmissions to the base band frequency. In one preferred embodiment of the invention, the data consists of a non-return to zero data signal 91 of 16.384 kilobits per second which is modulo-one encoded with the data clock 92 at 16.384 kilohertz to produce a Manchester encoded data stream at 32.768 kilobits per second. In one form of the signal 94 transmission, as shown in FIG. 1c, a high or "one" data level signal is transmitted as a high/low signal 95 due to the Manchester encoding with the data clock and a low or "zero" data signal is transmitted as a low/high signal 96.

Preprocessing of the signal prior to the data recovery circuit includes envelope detection of the on-off keyed carrier and signal limiting and zero crossing detection that causes the signal received to be converted into the raw received digital data signal 94 consisting of highs and lows which constitutes the received raw Manchester encoded data and clock signal.

Figures 3, 4:
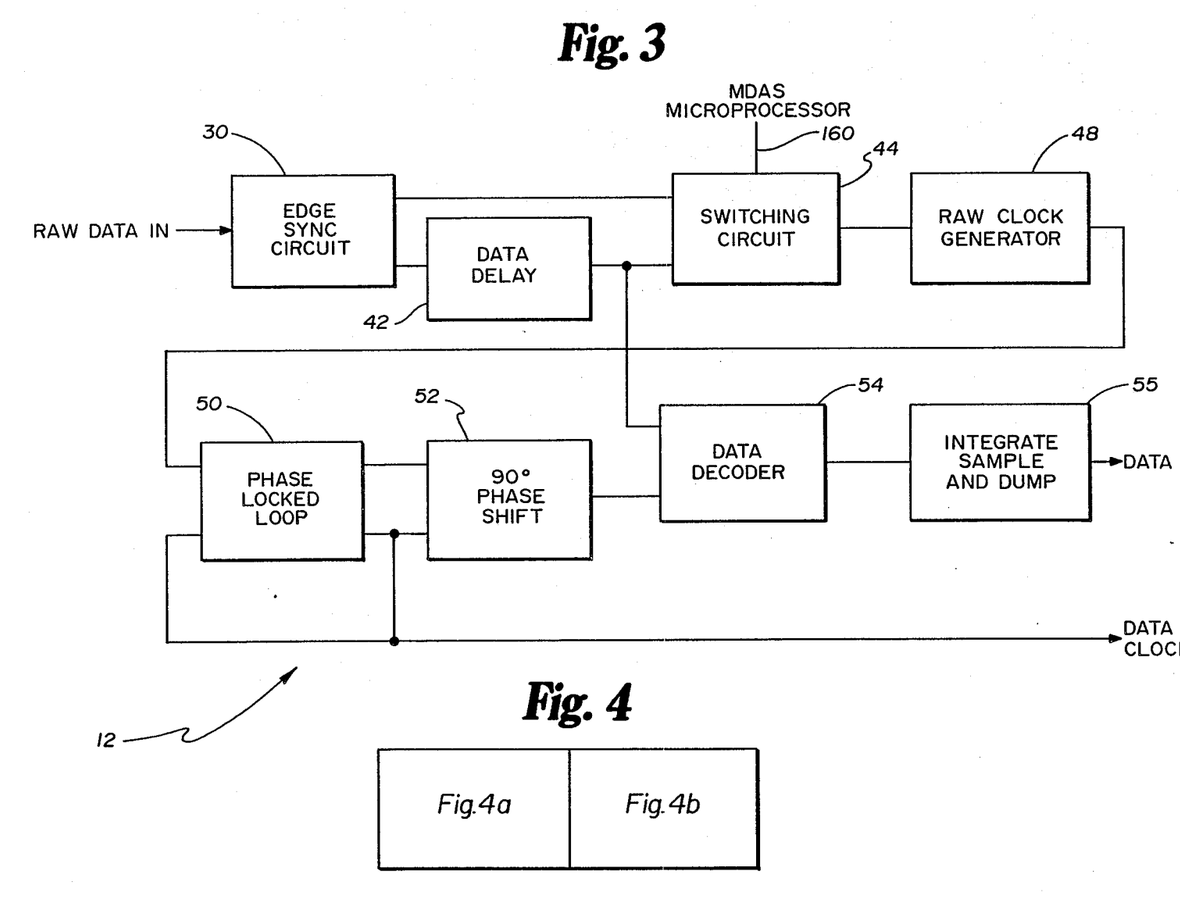
FIG. 3 is a basic block diagram of the data demodulator which is the subject of this invention.
FIG. 4, 4A and 4B are detailed schematic of the data recovery circuit.
Figure 4A:
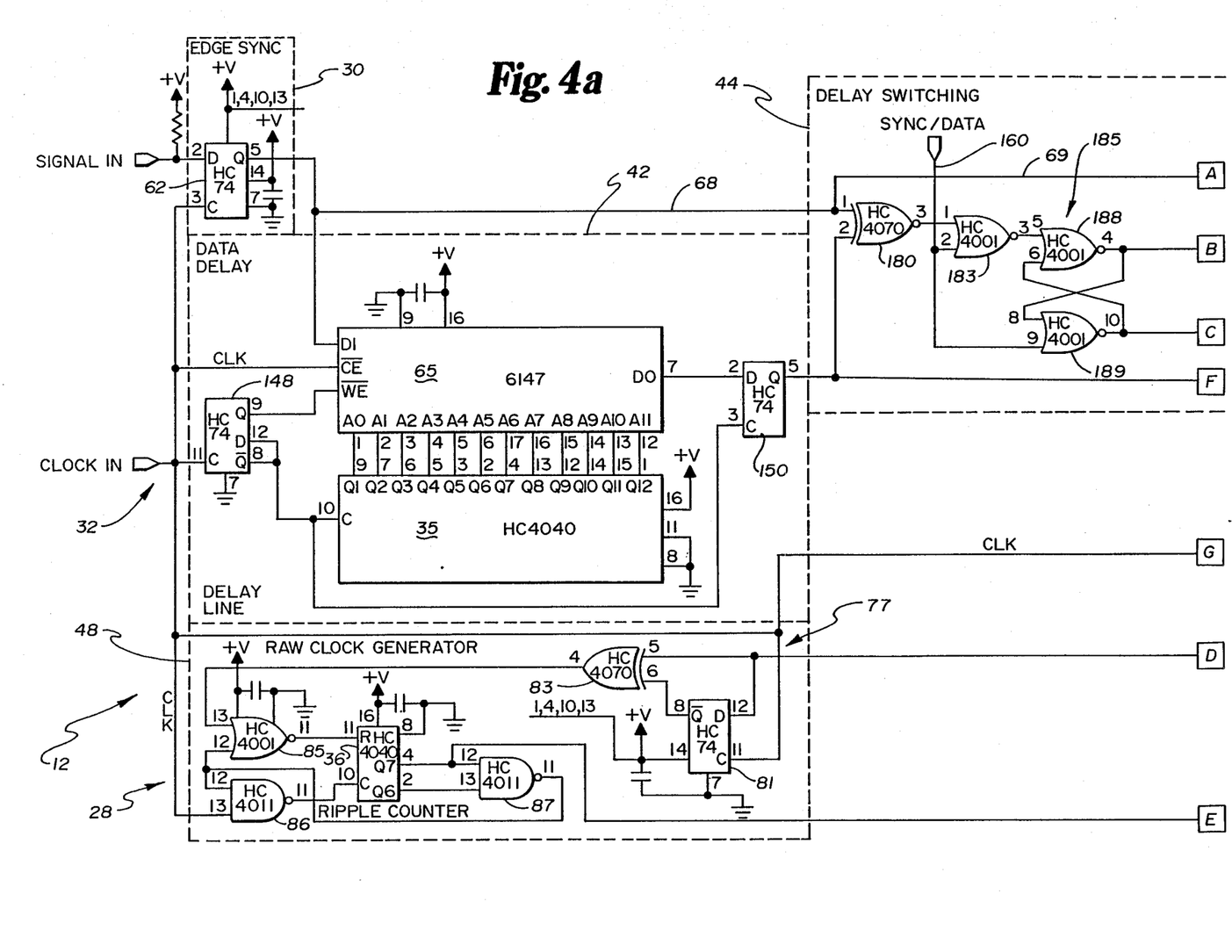
Figure 4B:
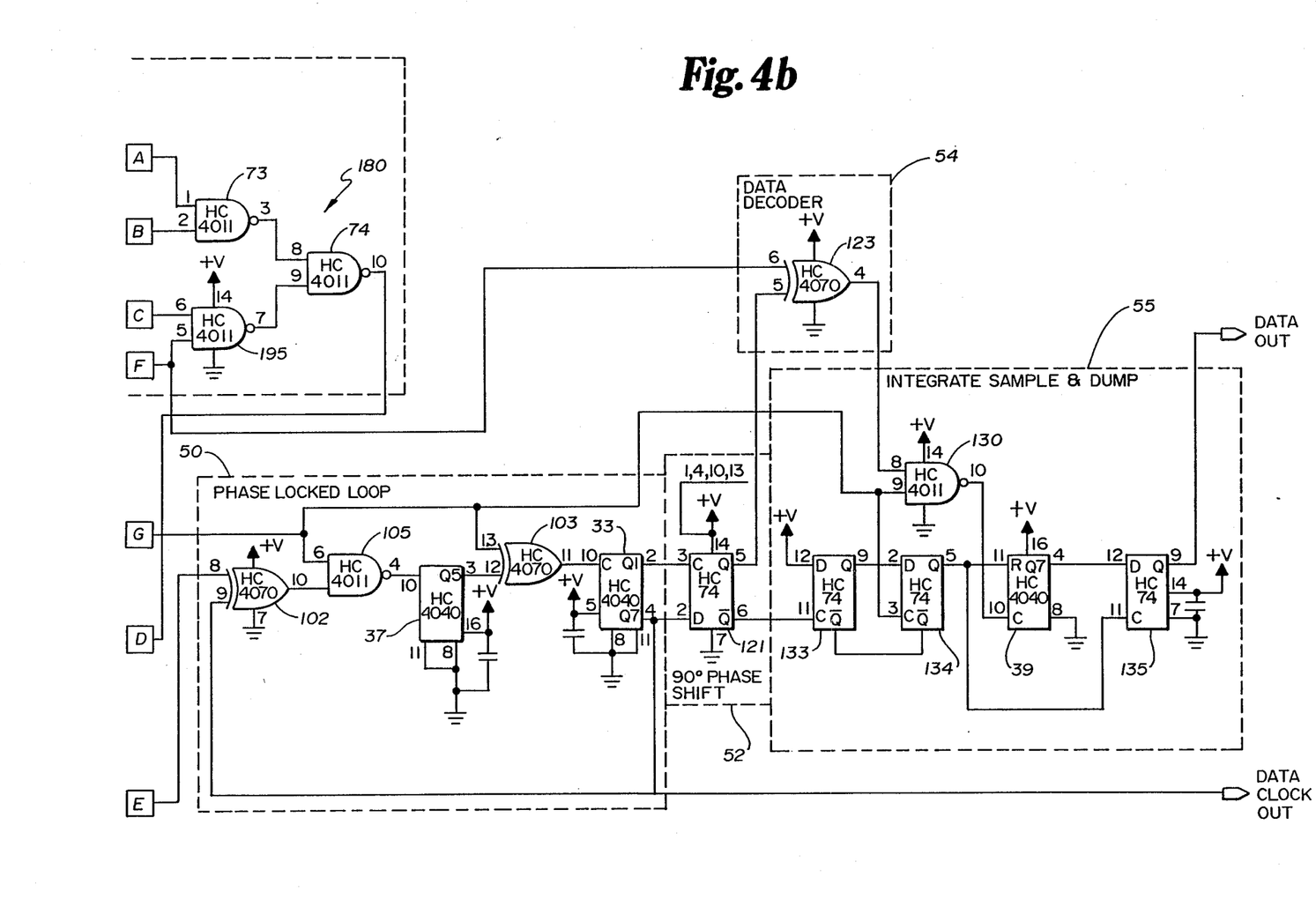

Referring to the block diagram of FIG. 3, the sequence of operation of the circuits shown in the detailed schematic of FIG. 4 can be understood. The digital data, which consists of the modulo-one composite of the non-return to zero data bits and the data clock is connected to an edge synchronization circuit 30. This synchronizes the data with the 2.065 megahertz master clock 32 which will also clock various asynchronous ripple counters 35–39 for purposes of the invention. The edged synchronized data follows two paths. One path is into a delay line 42 which cycles the data through a 4K CMOS Random Access Memory (RAM) which effectively delays the data for approximately 65 bits. It is this delayed data which is actually processed for purposes of obtaining the data output from the data recovery circuit 12.

While the data is being delayed by the delay line 42, the signal is passed through a delay switching network 44, a raw clock generator 48 and into a phase locked loop 50 to accurately recover the data clock. After a 90° phase shift 52, the recovered data clock and the delayed data are connected to a Manchester decoder 54 and an integrate, sample and dump circuit 55 to accurately decode and identify the data.

The output data is connected to a microprocessor which, after it identifies the twenty-one bit sync word, switches, with the switching circuit 44, the data clock recovery circuitry 48 from the raw signal coming in to the delayed signal which is being read out of the delay line 42. The balance of the data recovery and clock recovery is then processed from the delay line 42. This technique greatly reduces bit overhead for the circuit 12 since the incoming signal is first processed to recover the clock and using that synchronization the data which has been delayed is then processed. Therefore, a long string of synchronization bits is not required to achieve the objectives of the invention.

As will be understood from the review of the detailed schematic below, component count is also reduced, particularly the number of logic gates when implemented on a custom chip, with the use of asynchronous ripple counters 35-39 for timing rather than digital synchronous operation.

Referring now to the detailed schematic of FIG. 4, operation of the invention can be understood. The edges of the incoming data signal are aligned with the master clock with a D flip-flop 62 which is clocked with the 2.065 megahertz master clock 32. Accordingly, the Q output of the flip-flop 62 will track the incoming data with the edges synchronized with the master clock. The data is connected from pin 5 of the flip-flop 62 to pin 11 of a 4K CMOS RAM, 65 which will be discussed below, which serves to sample and ripple the data through the RAM to store sixty five bits of the incoming data. Pin 5 of the flip-flop 62 is also connected along lines 68 and 69 through two series connected NAND gates 73,74 which comprise part of the delayed switching circuit 44 which will also be discussed in more detail below. The output of the second NAND gate 74 is connected to a raw clock generator 48.

Figure 1:
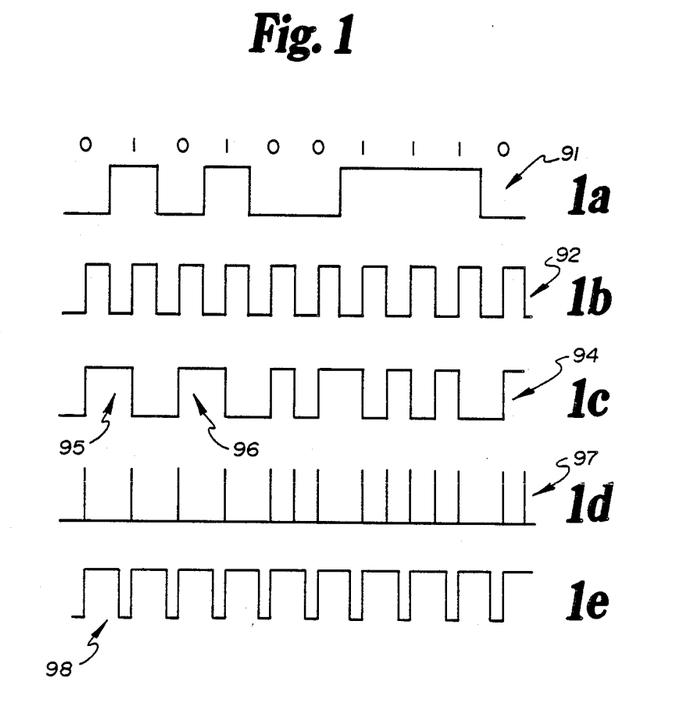
FIG. 1 with waveforms 1a-1e identify signal levels and characteristics of the non-return to zero (NRZ) data, the data clock, the Manchester encoded data which is received, and the pulse output and signal output from the raw clock generator used to recover the data clock, which is recovered with the use of the asychronous ripple counters.

The raw clock generator 48 consists of two stages, 77, 78 the first stage 77 comprising a D flip-flop 81 and exclusive OR gate 83. Whenever there is an edge on the incoming data stream, either a rising edge or a falling edge, pin 4 of the exclusive OR gate 83 will put out a positive pulse indicating an edge of the data stream. This pulse output 97 is represented in FIG. 1 as FIG. 1d. The pulse signal 97 is then applied to the second stage 78 of the raw clock generator 48. The second stage 78 is made up of a ripple counter 36 and three gates 85-87, two NAND gates 86-87 and one NOR gate 85. The counter 36 and gates 85-87 are configured to operate as a non-retriggerable one shot.

When the pulse output 97 from exclusive OR gate 83 passes through the first NOR gate 85, it resets the ripple counter 36. When the ripple counter 36 is reset, the Q7 and Q6 outputs, on pins 4 and 2 respectively, are low so that the output of the lower NAND gate 87 is high. This allows the upper NAND gate 86 to pass the clock, the 2.065 megahertz master clock 32, into the counter 36 and the counter 36 starts counting. At the same time the counter 36 starts counting, one of the inputs to the NOR gate 85, in pin 12, also goes high and inhibits any further reset pulses from reaching the counter 36. The counter 36 is inhibited from reseting until both the Q7 and Q6 outputs of the counter 36 are high. This time interval is approximately three fourths of the duration of a data bit. The time duration for Q7 to go high is approximately half the time duration of a data bit. The effective output, therefore, on pin Q7 of the ripple counter 36, is a square wave which is equivalent to the raw clock recovered from the data.

Operation of the raw clock generator 48 can also be understood by comparing FIGS. 1c, 1d and 1e. With the Manchester encoded data 94, there will sometimes be transitions that occur in the middle of a bit and sometimes transitions that occur on the edge of a bit. For example, if a series of ones or zeros in a row are transmitted, transitions will occur on both the center of the bit and edges of the bit. Since it is the clock 92 that is being recovered, the only desired transitions to recreate the clock are those that occur in the middle of a bit. Consequently, the timer 36 is started whenever a transition occurs from the output of the first half 77 of the raw clock recovery circuit 48 and the second stage 78 is inhibited for looking for another transition for three-fourths of the bit period. Therefore, upon the occurrence of a transition from a one to a zero once in the data stream, synchronization of the Manchester encoded data 94 will be achieved.

The resulting output from Q7, pin 4 of counter 36, is the raw recovered clock which is 180 degrees out of phase from the clock that generated the original Manchester encoded data stream 94.

The raw clock 98 is then applied to the phase locked loop 50 which filters or integrates the clock over a narrow band width. The phase locked loop 50 is specifically designed to achieve a 50% duty cycle. As shown in the detailed schematic diagram, the phase locked loop 50 consists of two exclusive OR gates 102, 103 a NAND gate 105 and two ripple counters 37, 38. The first exclusive OR gate 102 is a phase detector for the phase locked loop which compares the raw recovered clock signal 98 on pin 8 with the recovered clock signal from the Q7 output, on pin 4 of flip-flop 38, which is connected to pin 9 of the phase detector 102.

If the clock signal connected to pin 8, and the recovered clock signal connected to pin 9 are exactly in quadrature with each other, in other words at a ninety degree phase relationship, the output of the exclusive OR phase detector will be a data stream, a pulse stream, that has a 50% duty cycle. This 50% duty cycle is applied to a pulse inserting network composed of a NAND gate 105, counter 37 and exclusive OR gate 103. This pulse inserting network adds pulses to the clock stream clocking ripple counter 38 whenever Q5 of the pulse inserting ripple counter, 37 changes states. It will add half a pulse to the clock stream.

This clock stream is applied to a second ripple counter 38 the output of which is the recovered clock which is applied back in a feedback loop to the phase detector 50.

Operation of the phase locked loop can be understood considering two occurrences, the first when the recovered clock and the raw clock are in the phase with each other, the second condition being when the two signals are exactly out of phase with each other.

In the event the two signals going into the phase locked loop 50 are exactly in phase, the output of the exclusive OR gate 102 would always remain low and would not allow any of the master clock pulses to be gated into the pulse inserting network 105, 37, 103. Therefore, the output of the counter 37 in the pulse inserting network would not insert any pulses into the master clock data stream. The master clock would then be divided by the second ripple counter 38 or divided by two to the seventh power. This would be applied back to the input of the phase detector 102 on the phase locked loop 50. This is the minimum frequency that the phase locked loop 50 will lock onto.

The second condition would be when the two signals, the raw recovered clock on pin 8 and the recovered clock on pin 9 are exactly out of phase from each other. In this condition, the output of the phase detector 102 would always remain high. Therefore all of the master clock signals would be gated into the first ripple counter 37 in the pulse inserting network. After sixteen master clock cycles had been inserted into the ripple counter 37, Q5 would go high. With the clock pulse the high signal from Q5 connected to the pulse inserting exclusive OR gate 103, an extra half cycle of clock would be inserted into the ripple counter 38. After another 16 master clock cycles, Q5 would then go back low and an additional half clock pulse would be inserted into the second ripple counter 38. Therefore, after every 32 master clock pulses an additional pulse will have been added to the recovered clock.

These two conditions establish the lock range of the phase lock loop 50 and provide a center frequency at the desired recovered clock frequency which is 90° out of phase with the recovered clock to yield the 50% duty cycle desired.

In one preferred embodiment as shown in FIG. 4, the minimum frequency is the master clock, 2.065 megahertz divided by 128 or 16.132 kilohertz. The maximum frequency is the master clock supplemented by an extra pulse every thirty two clock cycles, also divided by 128, or 16.637 kilocycles. The center frequency is midway between these frequencies or at the 16.384 kilohertz data clock frequency.

Assuming the initial condition, initial input pulses in phase, the raw recovered clock will be at the 16.384 kilohertz rate and the returned or feedback frequency on pin 9, with no pulses added by the pulse inserting network, will be at the minimum 16.132 kilohertz rate. Naturally the pulse trains will lose their in-phase relationship due to the faster oscillating raw clock and the pulse inserting network will begin inserting pulses until the feedback loop, connected to pin 9, is at the same frequency as the input. This will occur at the 90° phase shift between input and output when the pulse inserting network is inserting enough pulses to equalize the frequencies.

The same process will occur when (or if) the second condition should occur. If the pulses originally occur 180° out of phase, the pulse inserting network will begin inserting pulses at the maximum rate (one extra pulse every 32 master clock pulses). This would drive the feedback frequency, on pin 9 of the phase detector 102, to the maximum rate of 16.637 kilohertz. Again the more rapidly oscillating feedback frequency would move the phase relationship away from the out-of-phase condition, reducing the number of pulses inserted by the pulse inserting network. This would continue until the pulse inserting network inserted just enough pulses to equalize the frequencies which would occur at the 90° phase shift when both frequencies are at the desired data clock frequency, the 16.384 kilohertz center frequency of the phase locked loop 50.

Consequently, when the input signal from the clock recovery circuit and the recovered clock are 90° out of phase, the output on pin 10 of the phase detector 102 will produce an output bit stream with a 50% duty cycle, a square wave having twice the frequency of the input signals. Gate 105 of the pulse inserter will therefore gate the master clock input pulse train to the counter 37 50% of the time.

Therefore, the output from the phase locked loop 50 will be locked on to the recovered clock frequency, but will be in a 90° phase shift relationship, halfway between being in phase with the raw recovered clock and completely out of phase with the raw recovered clock, when the loop is operating exactly at its center frequency. The objective, of course, is to have the clock output to be exactly in phase with the data which is to be decoded. This is accomplished by a 90° phase shift circuit 52 consisting of a flip-flop 121 which is being toggled at twice the output rate of the phase locked loop 50 which delays the quadrature output on pin 5 by half a pulse. This produces an output which is in phase with the data stream.

This output is applied to the data decoder circuit 54, consisting of exclusive OR gate 123, the other input to which is the biphase data stream obtained from the delay line 42. The output of the exclusive OR gate 123, on pin 4, is the recovered non-return to zero data stream. The output is still a raw data stream which means that it may continue to contain noise pulses and other anomalous transients which have occurred during transmission.

In order to clean up the data stream, the raw Manchester decoded data is applied to an integrate, sample and dump circuit 55 consisting of a NAND gate 130, three flip-flops 133–135 and another asynchronous counter 39.

The basic integrator is made up of the ripple counter 39 and NAND gate 130. When the raw data signal, into pin 8 of the NAND gate 130 is high, the master clock 32 is allowed to pass through the NAND gate 130 and toggle the ripple counter 39. If the period of the signal on pin 8 is longer than two to the sixth counts in the ripple counter 39, the output of Q7 of the ripple counter 39, on pin 4, will go high. At the end of the data pulse interval determined by the recovered clock, the interconnected flip-flops 133 and 134 will generate a positive going pulse for one clock period of the master clock signal. This will clock the state of Q7 into D flip-flop 135, which is the last flip-flop 135 of the data stream. At the same time that it clocks the data into the flip-flop 135, it will also reset the integrator by resetting the reset line, on pin 11, of the ripple counter 39.

The master clock divided by two to the sixth creates a time period equal to approximately one-half of the time interval of a data bit. The ripple counter 39 is clocked by the master 2.068 megahertz clock and is gated by the raw data. This effectively sets the threshold. Therefore, if more than half of the possible counts that the counter could achieve in the time interval exist, the output indicates the data is a one bit. If less than half of the possible counts the counter could achieve in that time interval exists, a zero output is indicated.

Prior art data recovery devices required clock synchronization bits, conventionally a pattern of zeros and ones, for a period of time prior to the transmission of data. The present invention achieves clock synchronization with the analysis of the clock encoded data as received. As described above, decoding of the data is delayed, with the use of the delay line 42 and the delay switching network 44 until after data clock synchronization has been achieved. The delayed data stream is then analyzed for content and decoded with the synchronized data clock.

To achieve the delay, a 4K CMOS RAM memory chip 65 is used with a 4040 ripple counter 35 generating the address.

To generate read and write cycles to the memory device, the incoming clock frequency 32 is divided into two phases by a flip-flop 148 and the first clock period is used to read from a particular memory location. The second clock period is used to write to the memory location that was just read from. The master input clock frequency is also used to drive the chip select line to clock the read/write address into the RAM chip.

As shown in FIG. 4, the input data after it has been edged synchronized with the master clock is applied to the CMOS static RAM 65. At the master clock frequency, the incoming data stream is sampled 63 times per bit to yield a bit capacity of the RAM 65 of 65 bit periods at this frequency to fill the 4096 memory locations of the RAM.

The counter 35 cycles the data through the memory 65. As the counter 35 cycles back to the first memory location, the data stored therein is clocked into the output flip-flop 150 which is connected to the data output D on pin 7, of the RAM 65 and this data from the Q output of flip-flop 150 is applied to the data decoder 54. Thereafter, each RAM location is sequentially read and clocked into the output flip-flop before the new data input is written into the memory location.

It will become obvious, however, that the process described above cannot continue in this manner since each data burst consists of only 96 bits. With 65 bits of delay, one bit of processing time and 21 bits of synchronization for the microprocessor to recognize the data as valid, if the operation of the circuit continued based on the received signal input to the circuit, the clock recovery circuit would become inoperative before the data was completely decoded.

Consequently, the delay switching circuit 44 shown in FIG. 4 is provided, under control of the MDAS microprocessor. When the microprocessor locates a 21-bit synchronization signal at the beginning of the data stream, it toggles the sync/not data line 160 low. The delay switching circuit 44 then switches the raw clock recovery circuit 48 from the input received data stream to the data stream coming out of the delay line 42. Since the delay is an integral number of bits, this switching has minimal effect on the clock recover circuit 48.

To further minimize discontinuities during the switching, coincidence of data is also required for the switch to take place. In other words, if a high data bit is being received and the signal coming out of the delay line 42 is a low bit, an extra edge would be created out of raw clock generator OR gate 83. To avoid such extra pulses the delayed switching circuit 44 only allows switching to take place when the input data and output data are at the same level, either both "ones" or both "zeros". This is achieved with exclusive OR gate 180. The delayed switching circuit 44 also requires that the output of the exclusive OR gate 180 be low and that the sync/not data line 160 also be low, both of which are connected to NOR gate 183 before the output of the bi-stable switch 185 consisting of NOR gates 188, 189 changes states. The output of the bi-stable switch 185 is connected to an and/or select gate 190 consisting of three NAND gates 73, 74, 195 which operate to select either the undelayed data signal or the delayed data signal. Thereafter, the delayed signal is connected through NAND gate 195 and NAND gate 74 to the raw clock generator 48 and the remaining data is then decoded through the data decoder 54 and the integrate, sample and dump circuit 55 for processing by the microprocessor.

In the foregoing manner, a uniquely configured data recovery circuit is created with a minimum of bit overhead and a minimum component count. It will be obvious to those skilled in the art that variations and modifications can be made to the specific circuitry shown and described and that different frequencies can be employed to achieve the objectives of the invention. All such variation and modifications are intended to be within the scope of the following claims to my invention.

Having described my invention I claim:

1. A data recovery circuit for demodulating transmitted encoded data comprising:
   means for receiving the encoded data;
   means for delaying the received encoded data for a delay time comprising a plurality of data bit time intervals;
   means for recovering the transmitted data clock signal from either the received data during the delay time or from the delayed data after the delay time connected to the received data and to the delayed data;
   means for switching the clock recovery means from the received data to the delayed data after a synchronization sequence of data bits has been received and for preventing switching from taking place until the logic level of the received data and the logic level of the delayed data are the same; and
   means for decoding the delayed data with the recovered data clock signal.

2. A data recovery circuit for demodulating transmitted encoded data comprising:
   means for receiving the encoded data;
   means for delaying the received encoded data for a delay time comprising a plurality of data bit time intervals;
   means for recovering the transmitted data clock signal from either the received data during the delay time or from the delayed data after the delay time;
   means for switching the clock recovery means from the received data to the delayed data after a synchronization sequence of data bits has been received comprising an and/or select gate for selectively switching either the received data or the delayed data to the means for recovering the received data clock; and
   means for decoding the delayed data with the recovered data clock signal.

3. A data recovery circuit for decoding transmitted data having a clock embedded therein comprising:
   means for receiving the encoded data:
   means connected to the receiving means and the master clock for synchronizing the received data with the master clock;
   means connected to the receiving means for storing a plurality of bits of the received data;
   means connected to the receiving means and the storage means for recovering the data clock signal embedded in the received data;
   a phase locked loop connected to the clock recovery means for synchronizing the recovered data clock with the master clock;
   a 90° phase shift circuit connected to the phase locked loop for synchronizing the recovered clock with the delayed data;
   a decoder means connected to the delayed data and to the recovered clock for decoding the data;
   an integrate, sample and dump circuit connected to the delayed data to determine the logic level of the data; and
   a delay switching circuit connected between the received data and the delayed data for switching the clock recovery circuit between the received data and the delay data after a predetermined sequence of synchronization bits have been received through the data recovery circuit.

4. A digital data recovery circuit for demodulating transmitted data comprising:
   a master clock;
   synchronization means operably connected to the master clock for receiving the transmitted data and synchronizing the received data with the master clock;

storage means operably connected to the synchronization means and the master clock for sampling and delaying the synchronized data;

a digital phase locked loop for recovering the data clock signal from the synchronized data comprising:

feedback means operably coupled to the master clock for generating a feedback pulse train having a frequency within a predetermined lock range;

comparison means operably coupled to the feedback means for receiving the synchronized data and the feedback pulse train and generating an output pulse train, the output pulse train having a duty cycle corresponding to the coincidence between the synchronized data and the feedback pulse train;

pulse inserter means operably connected to the feedback means and the master clock and the comparison means for generating a modified clock pulse train in response to the duty cycle of the output pulse train, whereby the modified lock pulse train is continuously modified to approach the frequency of the synchronized data when the frequency of the synchronized data is within the predetermined frequency lock range; and phase shift means operably coupled to the comparison means for shifting the phase of the output pulse train to coincide with the phase of the synchronized data; and decoder means operably connected to the digital phase locked loop and the storage means for decoding the delayed data with the recovered data clock signal.

5. The digital data recovery circuit of claim 4 wherein the synchronization means comprises an edge synchronization circuit.

6. A digital data demodulator circuit for receiving and demodulating encoded data transmitted as a data signal encoded with a data clock signal having a frequency within a specified range of frequencies, comprising:

a master clock having a frequency greater than the specified range;

synchronization means operably connected to the master clock for receiving the encoded data and synchronizing the encoded data with the master clock to produce a synchronized bit stream;

memory means operably connected to the synchronization means for storing the synchronized bit stream for a specified delay time to produce a delayed data bit stream;

clock recovery means operably connected to the synchronization means and the memory means for selectively recovering the data clock signal from the synchronized bit stream or from the delayed bit stream to produce a recovered clock signal;

data recovery means operably connected to the clock recovery means and the memory means for decoding the delayed bit stream to produce a recovered data signal; and means operably connected to the data recovery means and the clock recovery means for receiving the recovered data signal and for switching the clock recovery means from the synchronized bit stream to the delayed bit stream after a synchronization series of data bits has been received.

7. The digital data demodulator circuit of claim 6 wherein the encoded data comprises Manchester encoded data.

8. The digital data demodulator circuit of claim 6 wherein the synchronization means comprises an edge synchronization circuit.

9. The digital data demodulator circuit of claim 6 wherein the memory means comprises a random access memory for storing a plurality of data bits and a ripple counter connected to the random access memory for sequentially storing the data bits in the memory.

10. The digital data demodulator circuit of claim 6 wherein the clock recovery means comprises a digital phase lock loop.

11. The digital data demodulator circuit of claim 10 wherein the digital phase lock loop comprises:

input means operably coupled to the synchronization means and the memory means for selectively providing an encoded pulse train of the synchronized bit stream or the delayed bit stream;

pulse inserter means operably coupled to the master clock for selectively inserting additional pulses into a master clock pulse train to generate a modified clock pulse train having a modified clock pulse train frequency;

feedback means operably coupled to the pulse inserter means for generating a feedback signal pulse train responsive to the modified clock pulse train frequency; and comparator means operably coupled to the input means for providing a pulse inserter actuating signal in response to the comparative values of the encoded pulse train and the feedback signal pulse train, whereby the pulse inserter means is selectively actuated by the pulse inserter actuating signal to insert pulses into the master clock pulse train in response to the comparative values of the frequencies of the encoded pulse train and the feedback signal pulse train, and the feedback signal pulse train is thereby continuously modified to approach a predetermined value relative to the encoded pulse train.

12. The digital data demodulator circuit of claim 11 wherein the pulse inserter means comprises:

means operably coupled to the master clock for changing the phase of the master clock pulse train;

means operably coupled to the comparator means and the master clock for triggering the change in phase of the master clock pulse train in response to the pulse inserter actuating signal; and means operably coupled to the means for changing the phase and the means for triggering the change in phase for delaying the change in phase of the master clock pulse train long enough to generate an additional pulse in the modified clock pulse train.

13. The digital data demodulator circuit of claim 11 wherein the feedback means comprises an asynchronous ripple counter.

14. The digital data demodulator circuit of claim 11 wherein the comparator means comprises a phase detector.

15. The digital data demodulator circuit of claim 11 wherein the predetermined value relative to the input signal is a square wave having a frequency equal to, but ninety degrees out of phase with the encoded pulse train and wherein said digital data demodulator circuit further comprises phase shift means operably coupled to said feedback means for shifting the phase of the feedback pulse train signal ninety degrees, thereby producing the recovered clock signal in phase with the encoded pulse train.

16. The digital data demodulator circuit of claim 6 wherein the data recovery means comprises:
   a decoder operably connected to the memory means and the clock recovery means; and
   an integrate, sample and dump circuit operably connected to the decoder.

17. A digital data demodulator circuit for receiving and demodulating Manchester encoded data transmitted as a data signal encoded with a data clock signal having a frequency within a specified range of frequencies, comprising:
   a master clock having a frequency substantially greater than the specified range;
   edge synchronization means operably connected to the master clock for receiving the encoded data and edgesynchronizing the encoded data with the master clock to produce a synchronized encoded data bit stream;
   memory means operably connected to the synchronization means for storing the encoded data bit stream for a specified delay time to produce a delayed encoded data bit stream, comprising:
      random access memory for storing a plurality of data bits; and
      a ripple counter connected to the random access memory for sequentially storing the data bits in the random access memory;
   a digital phase lock loop operably connected to the synchronization means and the memory means for selectively recovering the data clock signal from the synchronized encoded data bit stream or from the delayed encoded data bit stream to produce a recovered clock signal;
   data recovery means operably connected to the clock recovery means and the memory means for decoding the delayed encoded data bit stream to produce a recovered data signal, comprising:
      a decoder operably connected to the memory means and the clock recovery means; and
      an integrate, sample and dump circuit operably connected to the decoder; and
   means operably connected the data recovery means and the clock recovery means for receiving the recovered data signal and for switching the clock recovery means from recovering the synchronized encoded data bit stream to recovering the delayed encoded data bit stream after a synchronization series of data bits has been received,
   whereby the data signal and the data clock signal are recovered from the same sequence of transmitted Manchester encoded data without the need for a precursor sequence consisting of only timing information.

18. A data recovery circuit for demodulating Manchester encoded data transmitted at a specified data clock frequency and having an identification field followed by a data field, comprising:
   a master clock having a frequency greater than the specified frequency;
   edge synchronization means operably connected to the master clock for receiving the encoded data and synchronizing the edge of the encoded data with the edge of the master clock to produce a synchronized encoded data signal;
   sampling means operably connected to the edge synchronization means and the master clock for sampling the synchronized encoded data signal at the master clock frequency to produce a sampled bit stream with each encoded data bit of the Manchester encoded data represented as a plurality of sampled bits;
   memory means operably connected to the sampling means for delaying the sampled bit stream a delay time comprising a plurality of encoded data bit time intervals to produce a delayed bit stream;
   clock recovery means operably connected to the sampling means and the memory means for recovering the data clock signal from the sampled bit stream or the delayed bit stream;
   data recovery means operably connected to the clock recovery means and the memory means for decoding the delayed bit stream with the recovered data clock signal to produce a sequence of decoded data bits; and
   means operably connected to the data recovery means and the clock recovery means for determining whether to recover the data clock signal from the sampled bit stream or from the delayed bit stream, comprising:
      means for receiving the decoded data bits operably connected to the data recovery means;
      means for examining the decoded data bits for a series of synchronization data bits in the identification field operably connected to the means for receiving; and
      means for switching the clock recovery means from recovering the data clock signal from the sampled bit stream to recovering the data clock signal from the delayed bit stream after the series of synchronization data bits are received operably connected to the means for examining and the clock recovery means,
   whereby the data clock signal is recovered from the sampled bit stream during the delay time and during the examination of the decoded data bits for the series of synchronization data bits in the identification field and then the clock recovery means is switched and the data clock signal is recovered from the delayed bit stream for decoding the data field.

19. A method for demodulating encoded data transmitted as a data signal encoded with a data clock signal having a frequency within a specified range of frequencies, comprising the steps of:
   receiving the encoded data;
   synchronizing the received data with a master clock having a frequency greater than the specified range;
   delaying the synchronized data for a delay time comprising a plurality of data bit time intervals;
   recovering the data clock signal from the undelayed data;
   decoding the delayed data with the recovered undelayed data clock signal;
   examining the decoded data for a series of synchronization data bits;
   switching to recovering the data clock signal from the delayed data after receiving the series of synchronization data bit; and decoding the remaining delayed data with the recovered delayed data clock signal.

20. A method for demodulating Manchester encoded data transmitted at a specified data clock frequency and having an identification field followed by a data field, comprising the steps of:

receiving the Manchester encoded data;

synchronizing the edge of the received data with the edge of a master clock having a frequency greater than the specified data clock frequency;

sampling the synchronized data at the master clock frequency to produce a sample bit stream with each encoded data bit of the Manchester encoded data represented as a plurality of sampled bits;

delaying the sampled bit stream for a delay time comprising a plurality of encoded data bit time intervals;

recovering the data clock signal from the undelayed bit stream;

decoding the delayed data with the recovered undelayed data clock signal;

examining the decoded data for a series of synchronization data bits in the identification field;

recovering the data clock signal from the delayed bit stream after the series of synchronization data bits are received; and decoding the remaining delayed bit stream comprising the data field with the recovered delayed data clock signal.

* * * * *